United States Patent [19]

Korevaar

[11] Patent Number: 5,777,768
[45] Date of Patent: Jul. 7, 1998

[54] MULTIPLE TRANSMITTER LASER LINK

[75] Inventor: Eric Korevaar, San Diego, Calif.

[73] Assignee: Astroterra Corporation, San Diego, Calif.

[21] Appl. No.: 705,515

[22] Filed: Aug. 29, 1996

Related U.S. Application Data

[60] Provisional application No. 60/003,397 Sep. 1, 1995.

[51] Int. Cl.$^6$ .................................................. H04B 10/00
[52] U.S. Cl. ............................. 359/172; 359/152; 359/159
[58] Field of Search ................................... 359/152, 143, 359/159, 172; 455/151.2; 370/277, 310

[56] References Cited

U.S. PATENT DOCUMENTS

| 3,488,586 | 1/1970 | Watrous et al. |
| 3,794,841 | 2/1974 | Cosentino et al. ............... 280/199 |
| 4,630,254 | 12/1986 | Tseng .................................. 370/1 |
| 5,416,627 | 5/1995 | Wilmoth ........................... 359/152 |
| 5,526,161 | 6/1996 | Suzuki et al. ..................... 359/172 |

OTHER PUBLICATIONS

W.M. Bruno, R. Mangual, and R.F. Zampolin, *Diode Laser Spatial Diversity Transmitter*, pp. 187–194, SPIE vol. 1044 Optomechanical Design of Laser Transmitters and Receivers. (1989).

E. Korevaar et al., *Status of SDIO/IS&T Lasercom Testbed Program*, pp. 116–127, SPIE vol. 1866, Jan. 1993.

E. Korevaar et al., *Status of BMDO/IST Lasercom Advanced Technology Demonstration*, pp. 96–107, SPIE vol. 2123, Jun. 1994.

E. Korevaar et al., *Design of Satellite Terminal for BMDO Lasercom Technology Demonstration*, pp. 60–71, SPIE vol. 2381, Sep. 1995.

J. Schuster et al., *Optomechanical Design of STRV–2 Lasercom Transceiver Using Novel Azimuth/Slant Gimbal*, pp. 227–239, SPIE vol. 2699, Jan. 1996.

K.E. Wilson et al., *Preliminary Results of the Ground/Orbiter Lasercomm Demonstration Experiment between Table Mountain and the ETS–VI Satellite*, pp. 121–132, SPIE vol. 2699, May 1996.

*Primary Examiner*—Kinfe-Michael Negash
*Attorney, Agent, or Firm*—Nydegger & Associates

[57] ABSTRACT

A system and method for establishing a laser link communications system in free space includes first and second terminals which are distanced from each other on an optical path. Each terminal includes a plurality of laser transmitters which together generate a plurality of laser beams, with each of the laser beams carrying a communication signal. Further, each terminal directs its independently generated laser beams along substantially parallel paths. Though their paths are substantially parallel, the transmitted beams generally overlap in the far field, at the other terminal, where they are collected and incoherently summed for reception and analysis of the communication signal.

18 Claims, 5 Drawing Sheets

MULTIPLE TRANSMITTER LASER LINK

This application claims priority on U.S. Provisional application Ser. No. 60/003,397 filed on Sep. 1, 1995.

FIELD OF THE INVENTION

The present invention pertains generally to electronic communications systems. More specifically, the present invention pertains to communications systems which transmit and receive information signals that are carried on laser light beams. The present invention is particularly, but not exclusively useful, for establishing a laser terrestial communications link, or a ground-satellite communications link which compensates for the scintillation pattern caused by wind or turbulence in the atmosphere.

BACKGROUND OF THE INVENTION

It is well known that a communication signal can be imposed upon a beam of laser light. Further, it is known that, a particular signal-carrying beam of laser light can be separated and distinguished from other beams of laser light which have a different wavelength or are in a different state of polarization. Not surprisingly, however, the use of a laser light beam as a communications carrier can present some difficulties. A significant such difficulty arises from what is known in the art as scintillation.

It happens that a single laser beam propagating through the atmosphere encounters variations in the index of refraction of the air which cause the beam to break up into separate beamlets, or turbules. More specifically, the beamlets or turbules in the laser beam are caused by wind or turbulence in the atmosphere, and the resultant pattern of beamlets is called a scintillation pattern. The scintillation pattern of turbules on a screen changes with a time scale of milliseconds or slower and varies from bright spots to dark spots over a distance scale which depends on various atmospheric parameters. For example, over a horizontal path of about 10 km distance at sea level using light at a wavelength of 780 nm, the size scale is about 10 cm. Interestingly, a similar size scale is encountered for light coming down from a star or a satellite to a telescope on the ground. On the other hand, when transmitting up from the ground to a satellite the size scale is found to be much larger. (For example many meters or tens of meters).

Due to the scintillating pattern, a receiver aperture which is small compared to the size of the turbules will see light intensity signals which vary between bright and dark. In general, this is unacceptable. Thus, although these variations will average out over time scales of many seconds, many applications require the signals to be detected on much faster time scales. For instance, a CCD acquisition camera trying to detect the direction to a laser beacon may need to collect its signal in 1 to 10 milliseconds, and a detector used for communication at a data rate of 500 megabits per second may need to collect its signal in 1 to 2 nanoseconds. If the communications detector needs a certain signal level Pmin to decode the data, and the communications channel is only allowed to decode the data incorrectly one time in a million, then enough margin must be included in the transmitted intensity so that the received signal is below Pmin only one time in a million. While an increase in the intensity is one way to improve the signal carrying characteristics of a laser beam, another solution is to increase the size of the receive aperture.

It is well known that some spatial averaging of the signal to reduce the needed margin can be accomplished by having a large receive aperture. For instance, a sixteen inch receive aperture for communications from a satellite can reduce the margin needed for signal fluctuations to about a factor of 5. (Compare this to the worst case of saturated scintillation and a very small receive aperture where a margin factor of a million might be needed for a one in a million error rate). However, on an uplink to a satellite it is not practical to put a large enough receiver on the satellite to help reduce the signal fluctuations. Finally, on a terrestrial laser communications link of a distance of about 10 km at a wavelength of 780 nm using a 10 cm receive aperture, a transmit power margin factor of about 300 is needed (with a single transmit aperture).

Apart from increasing the intensity of a laser beam or increasing the size of the receive aperture, a particular approach for reducing fading caused by scintillation has been suggested by Bruno et al. in an article entitled "Diode laser spatial diversity transmitter" SPIE Vol. 1044 Optomechanical Design of Laser Transmitters and Receivers (1989). In light of Bruno et al. the present invention recognizes that having multiple, non-coherent transmitters separated by about the turbule size scale allows for a great reduction in the transmitted power margin needed by reducing the detected intensity fluctuations. (Transmitters with a smaller spacing are still better than a single transmitter, but the advantageous effect is reduced). The reason this comes about is that the laser transmission paths are uncorrelated, and the probability that multiple lasers will have a dark spot in their scintillation patterns at the same place at the same time approaches zero rapidly as the number of lasers is increased.

FIG. 1 shows the situation for different numbers of transmitting apertures in the case that the receive aperture is very small and the saturation is completely saturated. (This is a limiting worst case and over-emphasizes the severity of the problem for a small number of apertures, but seems to agree with more detailed models for a large number of apertures). FIG. 1 also shows the probability of measuring a particular intensity plotted against that intensity, with the curves normalized so that the expected intensity is one, and the integrated probability is one. (This normalization means for instance that with 16 transmit apertures, each laser is operated at 1/16 the power for one aperture. Being able to operate each laser at full power only enhances the results described here). As can be seen in FIG. 1, with one transmitter there is a large probability of detecting very small intensities. With four transmit apertures, the probability of measuring a small intensity has been greatly reduced, and with 16 apertures, the probability is reduced still further. Using a more detailed model taking the finite receive aperture into account, and realizing that the atmospheric scintillation is not completely saturated, we determined that for the particular case of terrestrial laser communications at a range of 10 km we could expect to need the following transmit power margins for different numbers of uncorrelated apertures and an error rate of one in a million:

| Number of separate independent paths | Needed power margin for flucuations |
| --- | --- |
| 1 | 300 |
| 2 | 60 |
| 4 | 20 |
| 8 | 8 |
| 16 | 5 |
| 32 | 3 |

For the horizontal link, using a 20 cm receive aperture (covering about 2×2=4 turbules) and 4 separate transmitters, we expect to see the benefits of 4×4=16 independent paths, bringing the required power margin for scintillation down to a factor of about 5. For an uplink from the ground to a satellite, where no receiver averaging is possible, using 16 separate transmitters should achieve this same reduction in power margin needed to overcome atmosphere induced signal fluctuations.

In light of the above it is an object of the present invention to provide a system for two-way laser link communications through free space which uses multiple lasers transmitting from different spatial locations (separated by a few to tens or hundreds of centimeters) as a source for a beacon or communications signal. It is also an object of the present invention to provide a system for two-way laser link communications through free space which uses multiple lasers transmitting from different spatial locations to reduce fluctuations at a receive aperture located at a large distance from the transmitters (typically 100 meters to thousands of kilometers). Another object of the present invention is to provide a system for two-way laser link communications through free space which uses multiple transmit apertures for the combined purposes of summing laser powers, multiplexing different channels without complicated beam combining optics, and achieving transmit intensities within eye safety limits. Further, an object of the present invention is to provide a system for two-way laser link communication through free space which reduces fluctuations in the received signal caused by the intervening atmosphere. Still another object of the present invention is to provide a system for two-way laser link communication through free space which is relatively easy to manufacture and simple to operate and which is comparatively cost effective.

SUMMARY OF THE PREFERRED EMBODIMENTS

A system and method for establishing a two-way laser link communications connection through free space includes two terminals which are positioned at a distance from each other and which are located on the same optical path. Preferably, the optical path is along a line-of-sight. Each terminal in the system includes a plurality of laser transmitters. These transmitters are separated from each other at the terminal and are placed in an array to generate a plurality of non-coherent laser beams. For purposes of the present invention, the transmitted laser beams all emanate from the terminal and travel therefrom along substantially parallel paths. Although the transmitted laser beams are substantially parallel, due to divergence in each of the transmitted beams they will, at least to some extent, overlap one another in a far field. At least two of the non-coherent over-lapping transmitted laser beams carry the same communications signal.

A receiver at each terminal includes a reflector which has a primary mirror and a secondary mirror that work in concert to collect and focus the incoming light received from the other terminal. Specifically, the constituents of this received light are the non-coherent overlapping beams that are transmitted from the other terminal. The received light is then analyzed by a computer and the communications signal that is carried on the transmitted laser beams is reconstructed. For purposes of the present invention the computer can be any electrical device, simple or complex, which converts signals as required for operation of the system.

As contemplated by the present invention, the system can be used either for establishing a terrestrial communications link or a satellite communications link. Thus, in order to meet the specific needs of a particular application, several versions of the system for the present invention are contemplated. First, in a version that is perhaps best suited for use as a satellite communications link, the reflector is mounted on a telescope barrel-shaped base. This base has an aperture which collects the incoming light for the reflector. For this first version, the plurality of laser beam transmitters are arrayed around the periphery of the aperture. In a second, more compact, terrestrial version of the system for the present invention, the plurality of laser beam transmitters are positioned to transmit their respective beams through the reflector. For this second version, the separation and spacing of the transmitted laser beams are realized by optical manipulation of the transmitted laser beams. In all versions of the system of the present invention, the transmit wavelength of one terminal can differ from the transmit wavelength of the other terminal. Consequently, the respective receiver of the two terminals will be compatible with the wavelength transmitted by the other terminal. Further, although the two transmit wavelengths can be actually the same, they can have different circular polarizations. Additionally, combinations of different wavelengths and different polarizations can be used.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
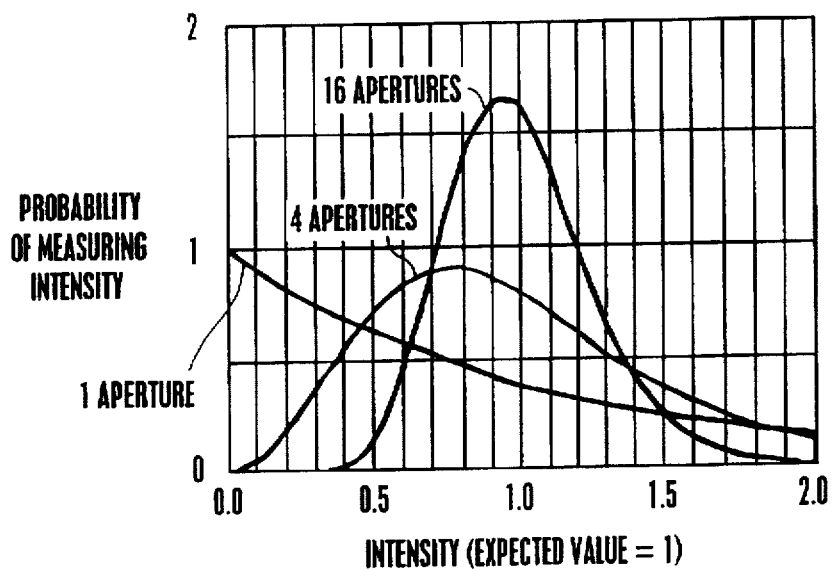
FIG. 1 is a graph showing the reduction in signal fluctuations using multiple transmitters.
Figure 2:
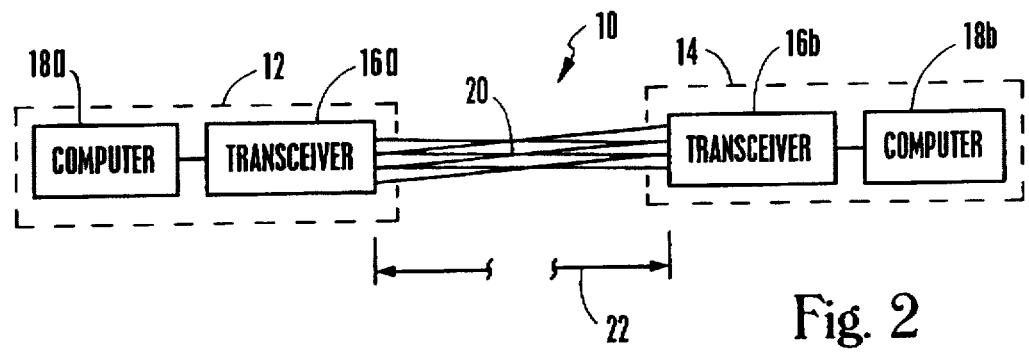
FIG. 2 is a schematic diagram showing two terminals of the present invention in an operational relationship with each other.

A system for a multiple transmitter laser link in accordance with the present invention is shown in FIG. 2 and is generally designated 10. As shown, the system 10 include a first terminal 12 and a second terminal 14 which is essentially the same as the first terminal 12. In both, there is a transceiver 16 and a computer 18 which is electrically connected to the transceiver 16 for purposes to be subsequently disclosed. FIG. 1 also shows that each of the terminals 12, 14 transmit laser beams 20 to each other through a distance 22. As intended for the present invention, the distance 22 may be somewhere on the order of one to fifty miles for a terrestrial link and, of course, much greater for a satellite link.

Figure 3:
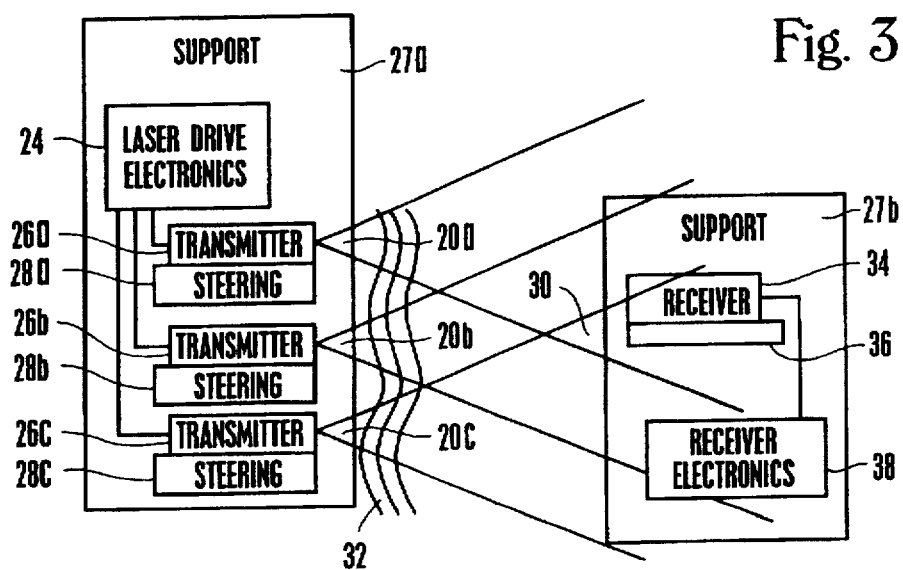
FIG. 3 is a schematic diagram of multiple laser beams emanating from one terminal in the system and overlapping in a far field at the other terminal.

In FIG. 3 a one-way communication path, as established by the system 10, is shown for purposes of disclosure. There it will be seen that within a particular terminal (e.g. terminal 12) laser drive electronics 24 provide drive current for separate laser transmitters 26, of which the laser transmitters 26a, 26b and 26c are exemplary. These laser transmitters 26a–c are pointed by respective steering assemblies 28a, 28b and 28c, also mounted on support member 27a, so that the respective emanating laser beams 20a, 20b and 20c are all pointed approximately in the same direction. For purposes of the present invention the laser beams 20 are pointed along substantially parallel paths, recognizing that in a far field 30 they will, at least to some extent, overlap one another. The laser transmitters 26a–c can be either semiconductor diode lasers or of some other type of laser well known in the art. The respective steering assemblies 28a–c can be either independent gimbals which are useful for steering the lasers transmitters 26a–c separately, or there can be a single steering assembly 28 which has a single gimbal for collectively holding and steering all of the multiple laser transmitters 26a–c. In this latter case, lenses or mirrors (not shown) can be used for fine pointing of the laser beams 20a–c. The drive electronics 24 can provide a communications signal to be modulated on the laser beams 20a–c, or the drive electronics 24 can provide a constant, non-modulated signal.

Preferably, as indicated in FIG. 3, the laser beams 20a–c are separated when they leave their respective transmitters 26a–c. The exact amount of separation depends on the particular application, and is related to the atmospheric scale size r0. As indicated above the separation of the various transmitters 26 should be about the turbule size expected for the particular application. For communications links across a 10 km horizontal path a separation of 10 cm between the various laser transmitter 26 would be typical. On the other hand, for providing laser tracing beacons or communications signals for the ground to satellites, a slightly greater separation of 10 to 20 cm would be typical.

Still referring to FIG. 3, it will be seen that after leaving the transmitters 26a–c, the laser beams 20a–c travel along respective propagation paths through the intervening atmosphere 32. For the present invention, the laser beams 20a–c are pointed in a manner such that the light from each laser transmitter 26 overlaps in the far field beam region 30. Although the amount of light in this far field region 30 from any one laser transmitter 26 may have large fluctuations in intensity due to scintillation caused by the intervening atmosphere 32, the fluctuations in the different laser beams 20 will be largely uncorrelated and the overall fluctuation in the intensity from the overlapped lasers beams 20 will be greatly reduced. The combined laser light from laser transmitters 26a–c is detected by a receiver 34 mounted on the base support member 27b in the other transceiver 16 of the terminal (e.g. terminal 14).

As shown in FIG. 3, the receiver 34 is pointed in the direction of the laser transmitters 26a–c by a steering assembly 36. The received signal from terminal 12, which may be used as a pointing beacon or may be a communications signal, is processed by receiver electronics 38 in terminal 14. Although the various components for system 10 are shown schematically in FIGS. 2 and 3 in a general form as boxes, it will be appreciated by the skilled artisan that these components may be produced by many methods which are well understood by persons skilled in the art of making laser links. It is important for the present invention, however, that more than one separate laser transmitter 26 be used. Further, it is important that all of the laser beams 20 which emanate from separate spatial locations in terminal 12 overlap in the far field 30 to achieve a reduction in signal fluctuations at the receiver 34 in terminal 14. Thus, the required power of each laser transmitter 26a–c is reduced by far more than would be expected from just summing the laser output powers.

Figure 4A:
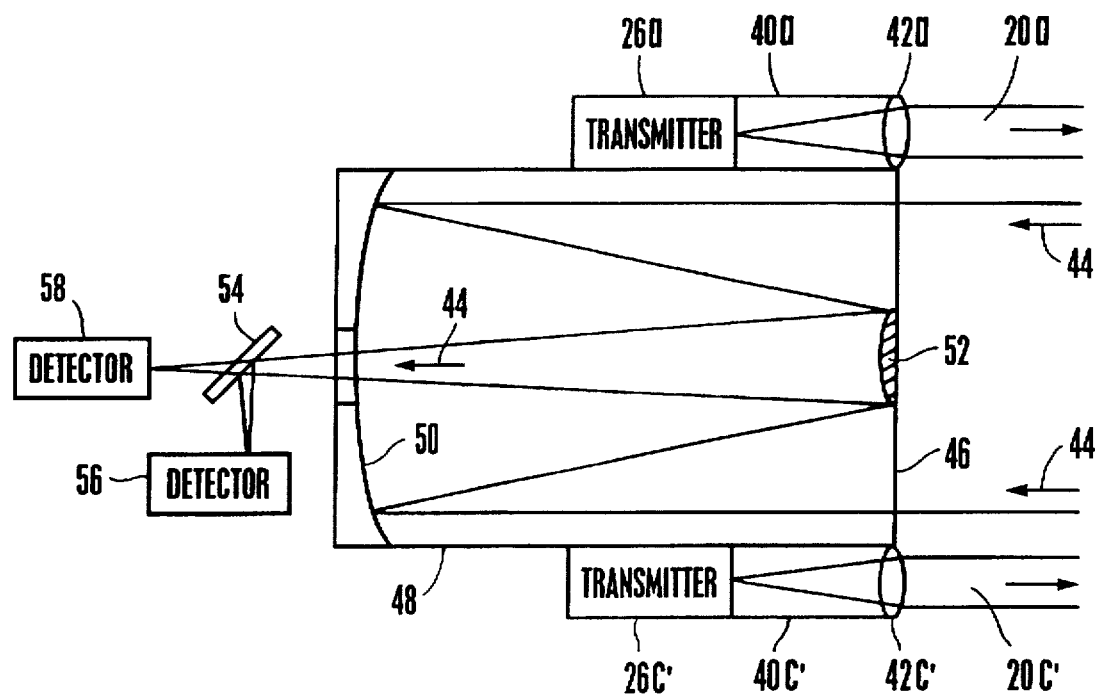
FIG. 4A is a side cut-away view of an optical configuration for a terminal of the system wherein the laser beams transmitted from the terminal are separated from the light received from the other terminal.
Figure 4B:
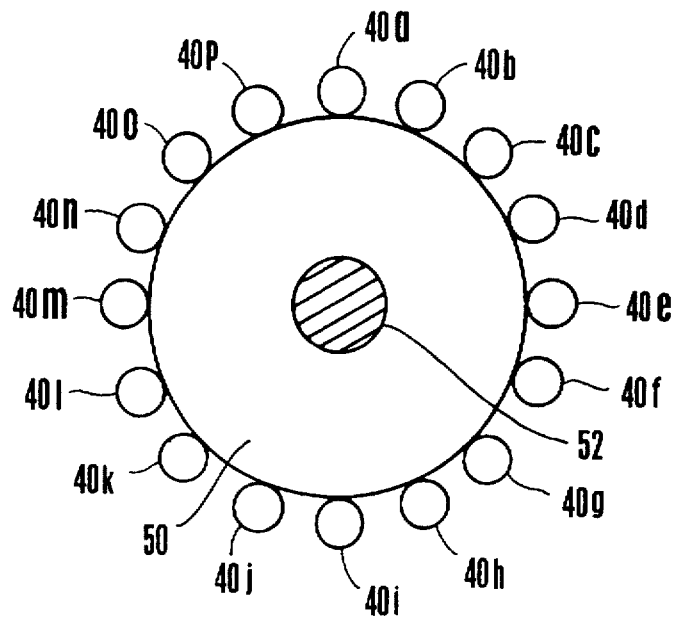
FIG. 4B is a front view of the optical configuration for the terminal shown in FIG. 4A.

A preferred embodiment for a laser communications terminal 12, 14 in accordance with the present invention is shown in FIGS. 4A and 4B. In particular, the components for a terminal 12 as shown in FIGS. 4A and 4B would be appropriate for the ground end of a satellite-to-ground laser communications link where the signal fluctuation problems associated with atmospheric scintillation are caused by the atmospheric path near the ground terminal. As shown, this embodiment utilizes sixteen separate laser assemblies 40a–p of which only laser transmitter assemblies 40a and 40i are seen in FIG. 4A. These transmitter assemblies 40 respectively contain laser transmitters 26a and 26i, which expand and are approximately collimated by focusing optics 42a and 42i in a manner that will be appreciated by the skilled artisan. The focusing optics 42 may be a single lens, as shown, or multiple lenses of a type well known in the pertinent art. The laser transmit assemblies 40 may also contain other components, such as polarization rotators (not shown).

As intended for the embodiment of the terminal 12 shown in FIG. 4A, the transmitted laser beams 20a–p emanate from different locations in the terminal 12. They are, however, pointed in approximately the same direction so that they will overlap and reduce fluctuations at a large distance in the far field 30 where the receiver 34 is located. Due to the long distances "d" which are involved, it will be appreciated that the laser beams 20a–p which emanate from the laser assemblies 40 of terminal 12 will be substantially parallel to each other. As so oriented, the transmitted beams 20 can provide a beacon to the satellite (not shown), indicating where it should point lasers back to the ground, and/or can be used to transmit communications signals to the satellite.

The ground laser communications terminal 12 described above can also be used as a receiver 34 for signals coming from a satellite. For this purpose, the incoming received light 44 is collected through receive aperture 46 that is formed by a telescope base 48. Specifically, the received light 44 first hits telescope primary mirror 50 and is reflected toward telescope secondary mirror 52. In turn, secondary mirror 52 reflects the received light 44 towards a beam splitter 54. At beam splitter 54, some of the received light 44 is reflected to focus on tracking detector assembly 56, while the remainder of the received light 44 passes through the beam splitter 54 to focus on communications detector assembly 58.

FIG. 4B shows a front view of the relative orientation of the different transmit laser assemblies 40a–p arrayed around the receiving aperture 46 of telescope base 48 of receiver 34. Even with the partial obscuration of aperture 46 that is caused by the secondary mirror 52, a size of sixteen inches for aperture 46 is large enough to enable direct averaging over many scintillation cells for the laser signal transmitted on received light 44 from the satellite. Further, this size is effective even though received light 44 is aberrated by the atmosphere 32 in the last 10–20 kilometers before reaching the receiver 34. At the same time a sixteen inch receiver aperture 46 is small enough to be available commercially at relatively low cost. On the other hand, the transmit aperture sizes established by focusing optics 42 of about two inches for each of the laser assemblies 40 are large enough to provide laser divergences down to about forty microradians (for communications uplinks) but can also be used for beacon uplink divergences of about one or two milliradians. Finally, the use of two inch transmit apertures for laser assemblies 40a–p allows the use of individual transmit laser powers up to 25 mW average while maintaining intensities in the eye safe region below 2 mW per square centimeter for near infrared lasers (for instance 700–900 nm wavelength). Larger transmit apertures can also be used in this configuration, allowing higher eye-safe powers. Higher power lasers, such as semiconductor lasers at 150 mW or amplified semiconductor lasers at 1 W can also be used, but then eye safety is not reached until the lasers have propagated and expanded over some distance.

Arraying the laser transmitters 26 around the receive aperture 46 allows for sufficient separation to allow significant fluctuation reduction at the satellite. As indicated above, the whole receiver/transmitter assembly of terminal 12 can be steered by a single gimbal apparatus.

Figure 5A:
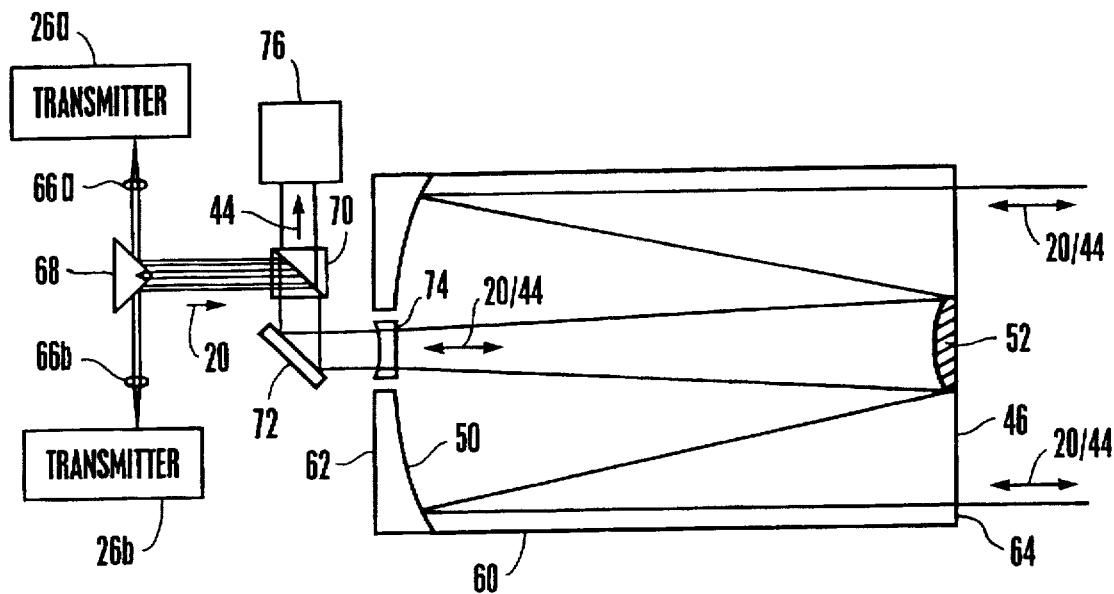
FIG. 5A is a side cut-away view of an optical configuration for an alternate embodiment of a terminal of the system wherein the laser beams are transmitted from the terminal along substantially the same path as the incoming light from the other terminal.
Figure 5B:
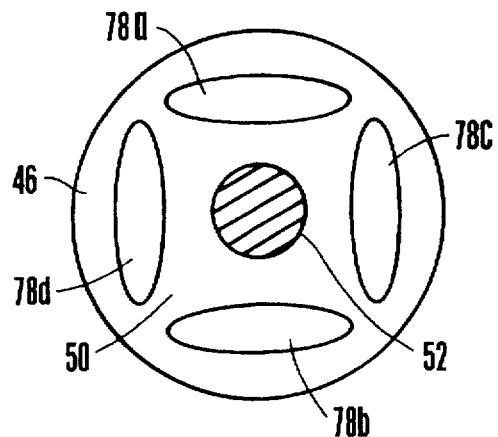
FIG. 5B is a front view of the optical configuration for the terminal shown in FIG. 5A.

FIGS. 5A and 5B show another embodiment for a laser communications terminal 12, 14 utilizing the invention which is appropriate for terrestrial laser communications (for instance between buildings) up to a range of about ten kilometers (10 km). In this case the transmitted laser beams 20 use the same telescope base 60 as is used for the receiver 34. More specifically, the laser beams 20 are combined spatially at the back 62 of the telescope 60 so that they emanate from different separated spatial positions at the front 64 of the telescope 60. Specifically, in FIG. 5A it will be seen that the laser beams 20 which are generated by laser transmitters 26a and 26b are collimated by respective focusing optics 66a and 66b. The collimated laser beams 20 are then combined together and with two other collimated laser beams (not shown) using a spatial combining prism 68 of a type well known in the pertinent art, such as a many faceted mirror. All of the combined transmitted laser beams 20 are then combine into the telescope beam path using transmit/receive beam splitter 70. In our preferred embodiment, the beam splitter is dichroic, separating 780 nm wavelength from 860 nm wavelength. Thus, while terminal 12 transmits 780 nm and receives 860 nm, terminal 14 transmits 860 nm and receives 780 nm.

The transmitted lasers are steered with pointing mirror 72, which can be controlled automatically by computer 18 to maintain alignment if desired. The collimated laser beams 20 then transmit through lens 74, expanding to secondary mirror 52 and primary mirror 50 before being transmitted out through the telescope aperture 46. Received signal light 44 (coming from the right in FIG. 5A) passes receive aperture 46, reflects off of primary mirror 50 and secondary mirror 52 and is collimated by lens 74. The receive light then reflects off of pointing mirror 72 and passes through transmit/receive beam splitter 70 and into receiver assembly 76, which contains both a communications detector and a pointing alignment detector.

FIG. 5B shows the beam locations 78 at the front of the eight inch telescope aperture 46 used in this embodiment. As implied above, the laser beams 20a–b will then pass through aperture 46 toward the other terminal. In general, if diode lasers are used, the transmitted beams may be elliptical. Using 50 mW peak power communications transmit lasers with a duty factor of 50%, the beams can be expanded to meet eye safety standards. At the same time, the received light signal 44 passes through receive aperture 46 except for the part obscured by secondary mirror 52.

Figure 6A:
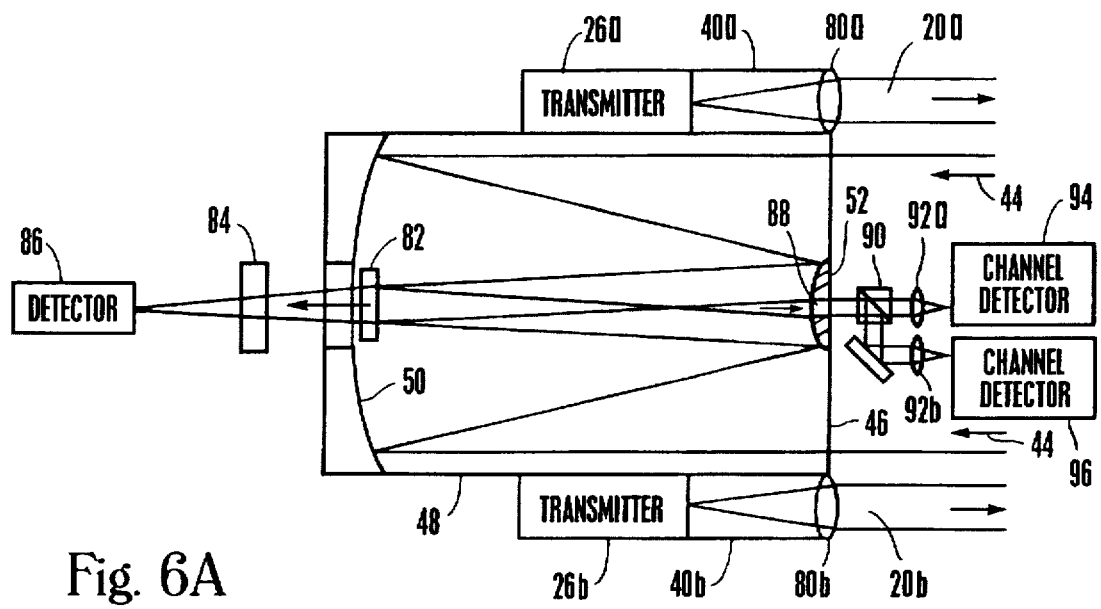
FIG. 6A is a side cut-away view of an optical configuration for an embodiment of a terminal of the system which is capable of receiving and analyzing a plurality of communications signals which are carried on light having different wavelength or polarization states.
Figure 6B:
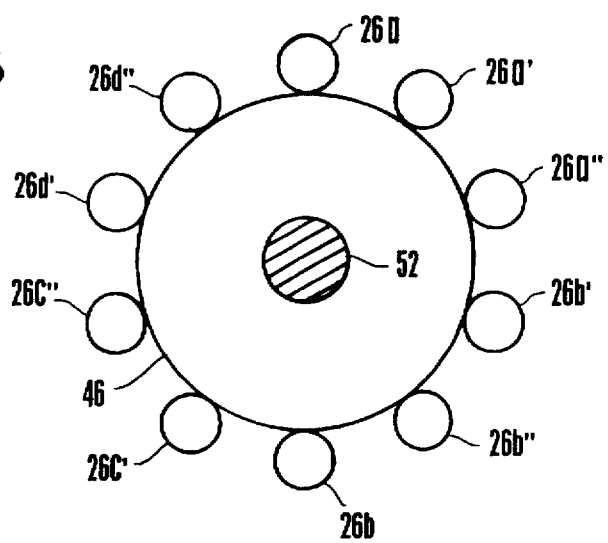
FIG. 6B is a front view of the optical configuration for the terminal shown in FIG. 6A.

FIGS. 6A and 6B show still another preferred embodiment for a laser communications terminal 12 utilizing the invention of system 10 in which more than one set of laser transmitters 26 which are combined in one apparatus for detection by different devices at terminal 14. In particular, this embodiment employs ten laser transmitters 26 of which two are used for an acquisition and tracking function, four are used for one high data rate communications channel, and the remaining four are used for a different high data rate communication channel. For this embodiment, the acquisition lasers are set at a wavelength near 850 nm, while the communications lasers are at wavelength near 810 nm. Further, the two communications channels propagate on different polarizations (i.e. left circular and right circular).

Referring to FIG. 6A, by way of example, laser transmit assemblies 40a and 40b respectively contain laser transmitters 26a and 26b, which are approximately collimated by respective focusing lenses 80a and 80b. The transmitted laser beams 20a and 20b, along with other laser beams 20 (not shown) are approximately co-aligned to overlap in the far field 30 at the receive aperture 46 of the receiver 34. Received light 44 enters the telescope from the right through receive aperture 46. This received light 44 then reflects off of primary mirror 50 and secondary mirror 52 as it propagates to dichroic communications/tracking beam splitter 82. The acquisition/tracking signal at wavelength 850 nm passes through the beam splitter 82, through narrowband filter 84 and into tracking detector 86. Preferably the tracking detector 86 is a CCD camera but could also be another position sensitive device such as a quadrant detector which is known in the art.

Unlike the tracking signals, the communications signals at 810 nm in received light 44 reflect off of beam splitter 82, and pass through a hole 88 in the secondary mirror 52. At this point, the two communications channels are distinguished from each other in that one is right circular polarized and the other is left circular polarized. After passing through hole 88, the two communications channels are separated by a channel one/two beam splitter 90. For the present invention, the beam splitter 90 preferably consists of a quarter wave plate which turns the circular polarizations into respective linear polarizations, and a linear polarization beam splitter. The separated communications channel signals are then respectively focused by lenses 92a and 92b onto a channel one communications detector 94 and a channel two communications detector 96.

FIG. 6B provides a front view of the transmit and receive apertures for the preferred embodiment shown in FIG. 6A. As stated above, received light 44 comes into the terminal 12, 14 through receive aperture 46 which though partially obscured by the back of secondary mirror 52 is effective for this purpose. FIG. 6B also shows how the transmitter 26 might be arranged for, this embodiment of a terminal 12 for system 10 to establish two different communications channels as well as a tracking capability. By way of example, a beacon laser light (for acquisition and tracking) is transmitted by two separate beacon lasers from locations such as is indicated for laser transmitters 26a and 26b. It should be noted here that even two co-aligned beacon lasers will provide a substantial reduction in far field intensity fluctuations as compared to one. For the communications channels, signals for communications channel one can be transmitted with right hand circular polarization from channel one emanation locations such as indicated for the four separate laser transmitters 26a', 26b', 26c' and 26d'. Signals for communications channel two are then transmitted on left hand circular polarization from four separate channel two emanation locations such as are indicated for laser transmitters 26a", 26b", 26c" and 26d". In this preferred embodiment, the data rate of each channel is around 500 megabits per second, for a combined data rate of one gigabit per second. This preferred embodiment shows that the multiple laser transmitter invention can be used more than once in the same device with different channels, each channel having multiple transmitters to reduce signal fluctuations in the far field 30 at the receiver 34. For the present invention, various combinations of the optical components disclosed above are contemplated.

OPERATION

In the above disclosure, there has been mention of the divergence of the laser beams 20 as they emanate from a terminal 12, 14. The importance of this divergence is, of course, based on the intention of the system 10 that all of the laser beams 20 overlap in the far field 30. This divergence and overlap, however, can not be haphazard. For the present invention, these characteristics of the laser beams 20 must be somehow controlled and, therefore, made predictable.

Figure 7:
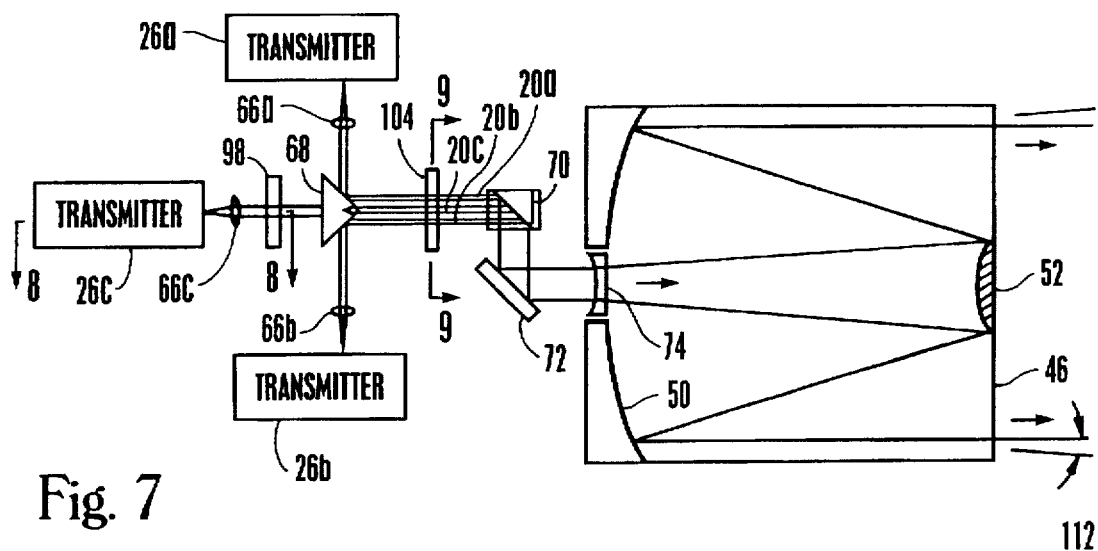
FIG. 7 is a schematic of an optical arrangement for a terminal of the system which includes a diffuser for controlled divergence of the transmitted laser beams.

FIG. 7 shows a schematic of optical components which can be used to shape the laser beams 20 as they emanate from a terminal 12, 14. For simplicity, only the transmitted laser beams 20 will be considered. It is to be appreciated, however, that received light 44 is also present. To discuss the transmitted laser beams, consider the three laser transmitters shown in FIG. 7 and designated 26a, 26b and 26c. Consistent with earlier disclosure, each of these laser transmitters 26a, 26b and 26c generates a respective separate laser beam 20a, 20b and 20c. In this version of the system 20, however, the laser beam 20c is bifurcated.

Figure 8:
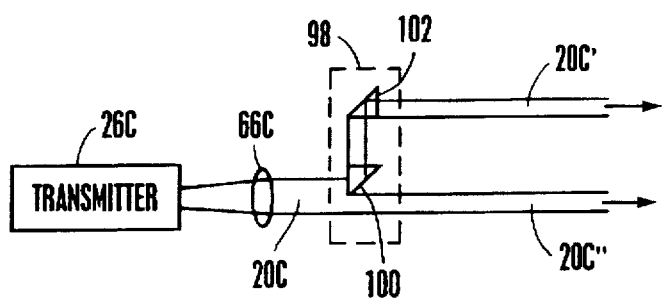
FIG. 8 is a diagram of a laser beam transmitter as used in the system shown in FIG. 7, with an associated beam splitter; as viewed from the line 8—8 in FIG. 7.
Figures 9A, 9B:
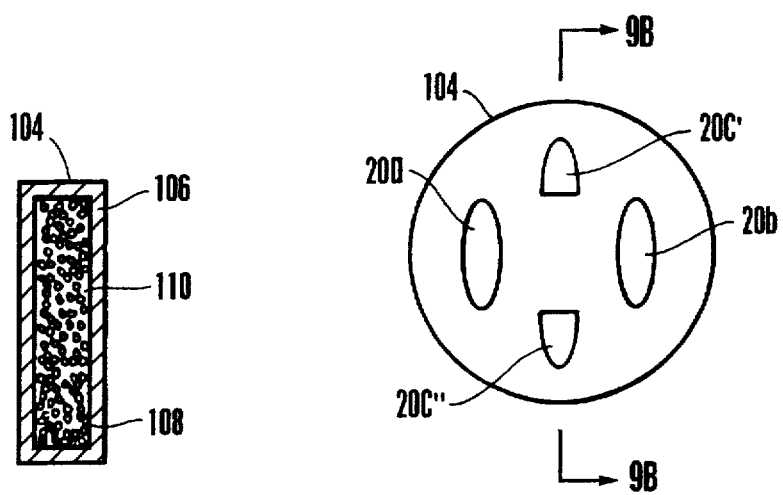
FIG. 9A is a view of the diffuser of the system as seen along the line 9—9 in FIG. 7.
FIG. 9B is a cross sectional view of the diffuser as seen along the line 9B—9B in FIG. 9A.

With reference to FIG. 8, it can be seen that after the laser beam 20c has passed through focusing optics 66c, the laser beam 20c is bifurcated by a beam splitter assembly 98. Specifically, a prism 100, which is mounted in the beam splitter assembly 98, diverts half of the beam 20c that is generated by laser transmitter 26c from its path. This diverted half is then directed toward another prism 102 where it is redirected along a path that is substantially parallel to the original path of laser beam 20c. Thus, a bifurcated laser beam is created which includes a beam 20c' that is separate and independent from its companion beam 20c". Importantly, there are now four different beams which pass through the prism 68 (shown in FIG. 7). These are; beam 20a, beam 20b, beam 20c' and beam 20c". The pattern which the paths of these beams make relative to each other is best seen in FIG. 9A.

Still referring to FIG. 7, it is to be seen that the laser beams 20a, 20b, 20c' and 20c" which pass through the prism 68, are directed from prism 68 to next pass through a diffuser 104. As implied above, the pattern in which these beams hit the diffuser 104 is shown in FIG. 9A. This pattern is important in that it separates the beam 20 in a manner which avoids blockage by the secondary mirror 52 as the beams 20 collectively pass outwardly through aperture 46. Also important, however, is the fact that the diffuser 104 establishes a divergence for the individual beams 20a, 20b, 20c' and 20c" which will cause them to overlap in the far field 30.

A divergence for the individually transmitted laser beams 20a, 20b, 20c' and 20c" is established by the diffuser 104 by effectively dividing each of the respective laser beams 20a, 20b, 20c' and 20c" into a very large number of micro-beams. To do this, the diffuser 104 effectively employs a multitude of micro-lenses. Specifically, as best seen in FIG. 9B, the diffuser 104 includes a glass casing 106 which is formed with a chamber 108. A preselected fluid is placed in this chamber 108, and a very large number of glass microspheres 110, each having a diameter on the order of about four hundred microns (400 µm), are immersed in the fluid in the chamber 108. For purposes of the present invention, the particular fluid that is used in chamber 108 should be selected to be optically compatible with the microspheres 110. More specifically, as will be appreciated by the skilled artisan, the fluid is chosen to nearly match the index of refraction of the microspheres 110. By proper selection of this fluid, it is possible to obtain a divergence for the laser beams 20a, 20b, 20c' and 20c' which is on the order of approximately one degree, or about 20 milliradians.

At this point, consider the characteristics of the laser beams 20a, 20b, 20c' and 20c". As they emerge from the diffuser 104, these beams collectively establish the pattern shown in FIG. 9A and have a collective aperture on the order of ten millimeters (10 mm). Also, as just disclosed, the beams will have a divergence about 20 milliradians. All of this predictably changes as the beams 20a, 20b, 20c' and 20c" continue to pass through the system 10.

After passing through diffuser 104, the laser beams 20 are turned by turning mirror 72 and directed through the lens 74. They are then reflected from secondary mirror 52 toward primary mirror 50, where they are reflected out through aperture 46. As the beams 20 pass through aperture 46, it happens that they have been expanded from an aperture of approximately ten millimeters (10 mm) to an aperture of approximately two hundred millimeters (200 mm). By optics well known by those skilled in the art, this nearly twenty-fold expansion in the aperture of the beams 20 also results in an inverse diminution of the divergence in these same beams 20 by a factor of twenty. Consequently, the divergence angle 112 for beams 20a, 20b, 20c' and 20c" as they emanate from the terminal 12, 14 will be around one milliradian (1 mrad). For most applications, this divergence angle 112 will ensure overlap in the far field 30. It is to be appreciated, however, that divergence can be controlled simply by constituting diffuser 104 with appropriately selected microspheres 110 and the proper emersion fluid.

While the particular system for two-way laser link communications through free space as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for reducing scintillations in two-way laser link communication through free space which includes a first terminal and a second terminal, wherein at least one terminal comprises:

a support member;

a steering assembly mounted on said support member;

a plurality of laser light transmitters for generating a respective plurality of transmitted laser beams, with each said transmitted laser beam carrying a communications signal, said plurality of laser light transmitters being mounted on said steering assembly for pointing said plurality of transmitted laser beams along respective substantially parallel beam paths to allow said transmitted laser beams to overlap in a far field at said other terminal; and a receiver mounted on said support member for incoherently summing signal-carrying light received from a plurality of overlapping individual laser beams emanating from said other terminal.

2. A system as recited in claim 1 further comprising a computer means for analyzing and reconstructing information from said communications signal in said received light.

3. A system as recited in claim 2 further comprising a base for holding said receiver and wherein said receiver comprises:

a communication detector connected to said computer means;

a base mounted on said support member; and a reflector mounted on said base for focusing said received light onto said communication detector.

4. A system as recited in claim 3 wherein said base is formed with an aperture having a periphery to expose said reflector to said received light, and said plurality of transmitters are arrayed around said periphery of said base aperture.

5. A system as recited in claim 3 wherein each said laser light transmitter has a transmitter aperture for forming said transmitted laser beam.

6. A system as recited in claim 5 wherein said base aperture is approximately sixteen inches in diameter and each said transmitter aperture is approximately two inches in diameter.

7. A system as recited in claim 3 wherein said plurality of laser light transmitters are mounted on said base to pass said plurality of transmitted laser beams through said reflector.

8. A system as recited in claim 7 wherein light in said transmitted laser beam has a first wavelength and said received light has a second wavelength.

9. A system as recited in claim 8 further comprising a dichroic beam splitter for separating said received light from said transmitted laser beams.

10. A system as recited in claim 7 further comprising a spatial prism for combining said plurality of transmitted laser beams for passage through said reflector.

11. A system as recited in claim 3 wherein said plurality of transmitted laser beams includes a first beam having a first wavelength, a second beam having a second wavelength with a left circular polarization, and a third beam having said second wavelength with a right circular polarization.

12. A system as recited in claim 11 which further comprises:

a tracking detector mounted on said base and connected to said steering assembly for selectively activating said steering assembly to point said laser light transmitters;

a communications detector mounted on said base; and a dichroic beam splitter mounted on said receiver for separating said first beam from said second beam, and from said third beam, to pass said first beam toward said tracking detector and to pass said second beam and said third beam toward said communications detector.

13. A system as recited in claim 12 wherein said communications detector comprises:

a first beam splitter having a quarter wave plate for turning the left circular polarization of said second beam and the right circular polarization of said third beam into respective linear polarizations for subsequent signal analysis; and a second beam splitter, said second beam splitter being a polarization splitter for separating said second beam from said third beam and for directing said second beam toward a first channel for signal analysis and for directing said third beam toward a second channel for signal analysis.

14. A method for reducing scintillations in a laser link communications system through free space which comprises the steps of:

generating a plurality of transmitted laser beams at a first terminal, with each said transmitted laser beam carrying a same communications signal;

pointing said plurality of transmitted laser beams along respective substantially parallel beam paths, said paths emanating from said first terminal, to allow said transmitted laser beams to overlap in a far field at a second terminal; and incoherently summing said plurality of transmitted laser beams at said second terminal to analyze said communication signal from said first terminal therein.

15. A method as recited in claim 14 which further comprises the steps of:

generating a plurality of transmitted laser beams at said second terminal, with each said transmitted laser beam carrying a same communications signal;

pointing said plurality of transmitted laser beams along respective substantially parallel beam paths, said paths emanating from said second terminal, to allow said transmitted laser beams to overlap in a far field at said first terminal; and incoherently summing said plurality of transmitted laser beams at said first terminal to analyze said communication signal from said second terminal therein.

16. A method as recited in claim 15 wherein said transmitted laser beams from said first terminal have a first wavelength, and said transmitted laser beams from said second terminal have a second wavelength.

17. A method for reducing scintillations in a two-way laser link communications system which comprises the steps of:

pointing a plurality of laser beams from a first terminal along substantially parallel paths to overlap in a far field at a second terminal;

imposing a first communications signal on each of said laser beams at said first terminal for transmission thereon to said second terminal along a path;

collecting a plurality of overlapping laser beams at said first terminal, said plurality of overlapping laser beams carrying a second communications signal transmitted from said second terminal substantially along said path; and reconstructing said second communications signal.

18. A method for reducing scintillations in a laser link communications system through free space which comprises the steps of:

generating a plurality of transmitted laser beams at a first terminal;

imparting a left circular polarization on at least one of said plurality of transmitted laser beams emanating from said first terminal to carry a first communication signal;

imparting a right circular polarization on at least one of said plurality of transmitted laser beams emanating from said first terminal to carry a second communication signal;

pointing said plurality of transmitted laser beams along respective substantially parallel beam paths, said paths emanating from said first terminal, to allow said transmitted laser beams to overlap in a far field at a second terminal; and separating said beams having a left circular polarization from said beams having a right circular polarization, at said second terminal, to separately analyze said first communication signal and said second communication signal.

\* \* \* \* \*